US009370963B2

(12) United States Patent
Perry

(10) Patent No.: US 9,370,963 B2
(45) Date of Patent: Jun. 21, 2016

(54) WALL PANEL FOR A CARAVAN AND A METHOD OF MANUFACTURE THEREOF

(75) Inventor: Steven James Perry, Leicester (GB)

(73) Assignee: CGI Creative International Limited, Kempston-Bedfordshire, England ( * ) Notice: Subject to any disclaimer, the term of this patent is extended or adjusted under 35 U.S.C. 154(b) by 251 days.

(21) Appl. No.: 13/520,767

(22) PCT Filed: Jan. 10, 2011

(86) PCT No.: PCT/GB2011/050030

§ 371 (c)(1), (2), (4) Date: Sep. 25, 2012

(87) PCT Pub. No.: WO2011/083341

PCT Pub. Date: Jul. 14, 2011

(65) Prior Publication Data

US 2013/0011633 A1 Jan. 10, 2013

(30) Foreign Application Priority Data

Jan. 8, 2010 (GB) .................................. 1000251.7

(51) Int. Cl.

| | |
|---|---|
| ***B29C 65/52*** | (2006.01) |
| ***B32B 5/18*** | (2006.01) |
| ***B32B 37/12*** | (2006.01) |
| ***B32B 38/14*** | (2006.01) |
| ***B44C 5/04*** | (2006.01) |

(52) U.S. Cl.

CPC ....... *B44C 5/0461* (2013.01); *Y10T 428/24802* (2015.01); *Y10T 428/249953* (2015.04); *Y10T 428/31786* (2015.04); *Y10T 428/31931* (2015.04); *Y10T 428/31938* (2015.04); *Y10T 428/31989* (2015.04)

(58) Field of Classification Search

CPC ...... B44C 5/0461; B32B 27/00; B32B 27/06; B32B 27/065; B32B 27/08; B32B 38/14; B32B 38/145; B29L 2007/002; B29L 2009/003; B29C 44/32; B29C 70/086; B29C 70/34; B29C 70/504; B41M 7/0027; C08J 5/12; C08J 5/124

USPC .............................. 156/79, 277, 307.1, 307.3

See application file for complete search history.

(56) References Cited

U.S. PATENT DOCUMENTS

| | | | | |
|---|---|---|---|---|
| 7,766,474 | B2 * | 8/2010 | Baxter et al. | 347/105 |
| 8,563,122 | B1 * | 10/2013 | Roberts et al. | 428/220 |
| 2006/0073318 | A1 * | 4/2006 | Tuttle | B32B 3/26 428/220 |
| 2006/0073327 | A1 | 4/2006 | Tuttle et al. | |
| 2008/0268225 | A1 * | 10/2008 | Dehennau et al. | 428/306.6 |

FOREIGN PATENT DOCUMENTS

WO WO 2006015440 A1 * 2/2006

OTHER PUBLICATIONS

EP Search Report Application No. 11 701 546.1 dated Oct. 1, 2015, pp. 1-5.

* cited by examiner

*Primary Examiner* — Sing P Chan

(57) ABSTRACT

A method of manufacturing a wall panel for a caravan, the wall panel having a first face and a second face, comprises printing a first design onto the first face of the wall panel for example using a first direct-to-substrate printer. A second design may be printed onto the second face of the wall panel, for example using a second direct-to-substrate printer (which may be the same printer as, or a different printer to, the first printer). Alternatively, the first design may be printed onto a first skin for the wall panel. The second design may be printed onto a second skin for the wall panel. The first and second skins, with the designs printed thereon, may then be assembled into a wall panel.

12 Claims, 5 Drawing Sheets

WALL PANEL FOR A CARAVAN AND A METHOD OF MANUFACTURE THEREOF

The present invention relates to the manufacture of a wall panel for a caravan (or mobile home, motor home etc). It also relates to a wall panel for a caravan (or mobile home, motor home etc), and to a caravan (or mobile home, motor home etc) containing such a wall panel.

Typically, the shell of a caravan is produced by assembling two side panels, two end panels, a floor and a roof (although one or both of the end panels may be integral with the roof). The floor, side panels and end panels are mounted onto a chassis, and the roof is then fitted. FIG. 1 is a cross-section through a typical wall panel (which may be either a side panel or an end panel) for a caravan. The wall panel has an inner skin 2 and an outer skin 3 which are mounted on a supporting matrix 1. The matrix 1 typically comprises a wooden frame, with openings in the frame being filled with polystyrene to provide thermal insulation. The outer skin (which forms the exterior of the caravan) is typically powder-coated aluminium, and the inner skin 2 is typically formed of 3 mm plywood. The aluminium outer skin 3 and the plywood inner skin 2 are each glued to the matrix by a respective glue layer 6. Wallpaper 4 or some other decorative covering is provided on the inner surface of the inner skin 2. The outer skin 3 is usually decorated with printed self-adhesive vinyl elements 5 and possibly badges (not shown) that are stuck onto the outer skin 3 during or after assembly of the wall panel.

The above manufacturing process has a number of disadvantages.

- The manufacturing process requires at least three separate assembly steps—the inner and outer skin must each be mounted on the matrix, and the self-adhesive vinyl labels must be stuck onto the outer skin. (The plywood is usually supplied with one face already covered in wallpaper, but if not a further step of mounting the wallpaper on the inner skin is required.) Moreover, it is usually required to attach notices such as safety notices and/or operating instructions to the inner and/or outer skin, and this requires a further step. As a result the manufacture of the wall panel is time-consuming and labour-intensive.
- The step of covering the inner skin with wallpaper, or other decorative covering, can (if required) be particularly time-consuming. Wallpaper typically has a width of 1-1.2 m, so that several strips of wallpaper must be applied to cover an entire wall panel, and care needs to be taken to align the strips. (Even if the plywood is supplied with one face already covered in wallpaper, care must still be taken to align adjacent sheets.) The task of aligning different strips may be made easier by using wallpaper with a diffuse pattern so that exact alignment of neighbouring sheets is not required, but this restricts the possible wallpaper patterns that may be used.
- Plywood sheets that are covered with wallpaper on the one side are only available in limited sizes, resulting in joins approximately every 1200 mm along the internal length of any vehicle. It is possible to cover the joins with jointing tape or beading, but this can be unsightly and requires a further manufacturing step. The arrangement of plywood panels 7 for a typical caravan wall, and the joints 8 between adjacent panels, are shown in FIG. 2.
- If the vehicle is not completely waterproof, damp usually penetrates the plywood thereby causing the plywood to swell out. This results in expensive repairs.

SUMMARY OF THE INVENTION

A first aspect of the invention provides a method of manufacturing a wall panel for a caravan, the method comprising: printing a first design onto a first skin of/for the wall panel.

The term “wall panel” as used herein covers, for example, a side panel and an end panel; it may also cover parts thereof, such as a door. The term “caravan” as used herein is intended to cover both self-propelled vehicles (such as a “motor home”) or non-self propelled vehicles such as a trailer caravan or a mobile home. The term “design” as used herein is intended to cover, for example, a word or words (e.g. a manufacturer’s name, identification of the model of caravan), text (e.g. safety notices, instructions), graphics (such as decoration that simulates wallpaper) and striping, a logo etc.

The first skin may form, in use, an interior skin of the wall panel. By “interior” is meant that the first skin forms an interior face of the wall panel, when the wall panel is incorporated into an assembled caravan.

In a preferred embodiment, the method further comprises printing a second design onto a second skin of/for of the wall panel. When the wall panel is assembled into a caravan, one the skins will form the outer (exterior) face of the wall panel and the other of the skins will from the inner (interior) face of the wall panel.

The first design may be printed using a first direct-to-substrate printer.

The second design may be printed using a second direct-to-substrate printer.

The first direct-to-substrate printer and the second direct-to-substrate printer may be the same printer (i.e. the same direct-to-substrate printer is used twice, once to print on one skin of/for the wall panel and a second time to print on the other skin of/for the wall panel). Alternatively different printers may be used for the two printing steps.

In general, the wall panel comprises a matrix, on which the first and second skins are mounted. A method of the invention may be performed after the skin(s) of a wall panel have been assembled onto the matrix; that is, the wall panel is first assembled by mounting the skin(s) on the matrix, and the design(s) are then printed onto the skin(s) of the assembled wall panel.

Alternatively, a method of the invention may be performed before the skin(s) for a wall panel have been assembled onto the matrix of the wall panel; that is the design(s) are printed onto the skin(s), and the wall panel is subsequently assembled by mounting the skin(s), with the design(s) printed thereon, onto the matrix. In this case, the method may attaching the first and second skins for the wall panel (with the design(s) printed thereon) to the matrix of the wall panel, with the first and second skins being mounted on opposite sides of the matrix to one another.

The first skin may be a non-metallic skin. It may be formed of one of: HIPS, APET, ABS, a composite material, foam PVC or water-resistant MDF.

The method of the invention has a number of advantages, including the following:

- Reduced assembly cost as no operator on the production line now needs to fit graphics (only badges must be fitted separately); furthermore, safety notices and/or instructions may be formed in the printing step(s), and the need to fit safety notices or instructions as a separate step is eliminated. In addition, positions where components, such as interior fittings, are to be mounted on the wall panel may be printed onto the skin, to facilitate the subsequent mounting of the component(s).
- Increased flexibility from a design/creativity point of view—any desired image can be printed on either side of the wall panel.
- The invention can dramatically reduce the cost of exterior graphics, as a consequence of doing away with the expensive self-adhesive vinyl element.

Environmental/recycling advantages—the elimination of self-adhesive vinyl labels facilitates recycling of the aluminium outer skin. Moreover, if environmentally-friendly inks such as UV inks or water-based inks are used for the printing rather than traditional solvent-based inks, this provides a further environmental advantage.

A second aspect of the invention provides a wall panel for a caravan, the wall panel comprising a matrix and first and second skins attached to the matrix, the first and second skins being on opposite sides of the matrix to one another; wherein the first skin is formed of one of: HIPS, APET, ABS, a composite material, foam PVC or water-resistant MDF.

The first skin forms the interior face of the wall panel, when the wall panel is incorporated into a complete caravan. Use of: HIPS, APET, ABS, a composite material, foam PVC or water-resistant MDF has the advantage that these materials are available in large area sheets, so that the inner skin may be formed from a single sheet. As well as eliminating the joints between panels, this also reduces the time taken to mount the inner skin on the matrix.

The second skin may be formed of the same material as the first skin. This provides good stability of the wall panel against, for example, changes in temperature as both skins of the wall panel will expand or contract by the same amount.

A third aspect of the invention provides a wall panel manufactured by a method of the invention.

A fourth aspect of the invention provides a caravan comprising at least one wall panel of the invention.

Preferred embodiments of the present invention will be described by way of illustrative example, with reference to the accompanying figures in which.

Figure 4:
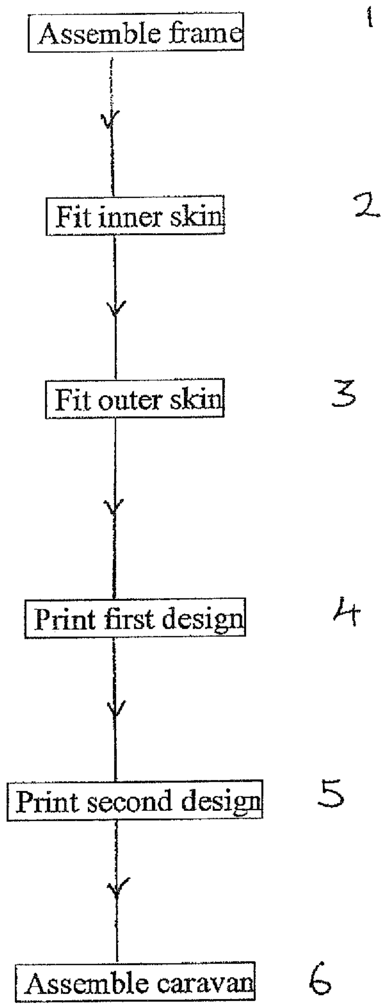
FIG. 4 is a block flow diagram illustrating principal steps of a method of the invention.

FIG. 4 illustrates the principal steps of a method of manufacturing a wall panel according to one embodiment of the invention. In this embodiment the wall panel is initially assembled, and the design(s) are printed onto the skins of the wall panel after the wall has been assembled by mounting the skins on the matrix. Thus, at step 1, the matrix 1 of the wall panel is assembled. The matrix may, for example, include a frame, for example a wooden frame, and contain an insulating material such as expanded polystyrene to provide thermal insulation. This would be appropriate if the matrix is required to contribute to the structural strength of the resultant wall panel. Alternatively, if the inner and outer skins provide sufficient structural strength for the wall panel so that the matrix does not need to contribute to the strength of the resultant wall panel, the matrix may consist primarily of a thermally insulating material such as expanded polystyrene. (In this case, depending on the thermally insulating material used, the matrix may need to be provided with mounting portions in locations where it is desired to join the wall panel to another wall panel or to the chassis, floor or roof of the caravan, or where it is desired to mount a component onto the wall panel.)

At step 2, the inner skin 2 of the wall panel is attached to the side of the matrix that will become the inside when the resultant wall panel is assembled into a caravan. The inner skin may be formed of any suitable material, and may be adhered to the matrix by any suitable method such as bonding with an adhesive 6.

Figure 2:
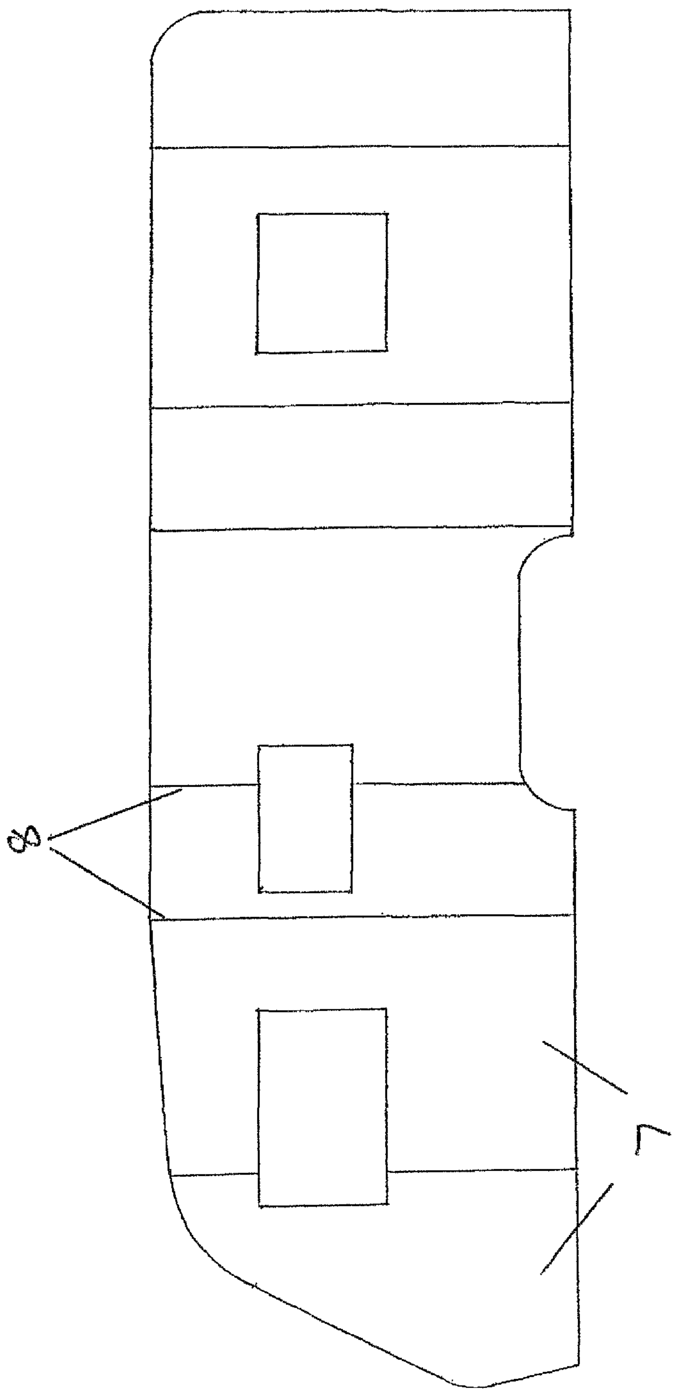
FIG. 2 shows the plywood panels required for a typical wall panel for a caravan.

In one preferred embodiment, the inner skin may be formed from a single sheet of material, for example a sheet of a recyclable polyester such as APET (amorphous polyethylene terephthalate). Use of APET has the advantage that APET is available in large area sheets, so that the inner skin may be formed from a single sheet thereby eliminating the need to make the inner skin in a number of separate panels as in FIG. 2. As well as eliminating the joints between panels, this also reduces the time taken to mount the inner skin on the matrix. Moreover, a 2 mm thick APET sheet, which is a suitable thickness for the inner skin, is lighter than the plywood equivalent, so that use of APET for the inner skin in place of plywood reduces the weight of the wall panel. Also, APET provides better fire protection than plywood, and also is moisture resistant and so therefore will not be affected by damp.

The invention is not however limited to use of APET for the inner skin 2, and other materials may be used for the inner skin. Examples of other materials that may be used for the inner skin include, but are not limited to: HIPS (high impact polystyrene), ABS (Acrylonitrile butadiene styrene) water-resistant MDF (medium density fibreboard), composite materials such as glass-reinforced plastics, or foam PVC (foam polyvinyl chloride) (for example, Foamalux rigid foam PVC sheeting having a thickness of approximately 3 mm from Brett Martin Limited). These materials also have the advantages of being available in large area sheets so that the inner skin may be formed from a single sheet, of being lighter than the plywood equivalent, and providing better fire-resistance and moisture protection than plywood.

Moreover, while it is preferable that the inner skin is formed from a single sheet of material rather than from a number of separate panels, in principle any material that can be printed using a direct-to-substrate printer may be used as the inner skin regardless of whether or not it is available in sheets large enough for the inner skin to be formed from a single sheet of material (subject to the material meeting other requirements such as weight and cost)—in principle, a conventional plywood inner skin could be used in the invention, as a direct-to-substrate printer can print onto plywood.

At step 3, the outer skin 3 of the wall panel is attached to the side of the matrix that will become the outside when the resultant wall panel is assembled into a caravan. The outer skin may be formed of any suitable material, for example, powder coated aluminium or any one of the materials mentioned above for the inner skin 2, and may be adhered to the matrix by any suitable method such as bonding with an adhesive layer 6.

It should be noted that it is preferable that the materials used for the inner skin and the outer skin are chosen to provide a stable wall panel. For example, it is desirable if the material used for the inner skin and the material used for the outer skin have the same, or similar, coefficients of thermal expansion as one another, so that the inner skin and the outer skin expand or contract by the same or similar amounts if the temperature varies. One convenient way of achieving this is to make both the inner skin and the outer skin of the same material (and preferably to make both skins from one of the materials listed above for the inner skin).

The result of step 3 is a wall panel having a matrix and first and second skins attached to the matrix, the first and second skins being on opposite sides of the matrix to one another. The first and second skins 2,3 constitute a first face and a second face of the wall panel.

Figure 1:
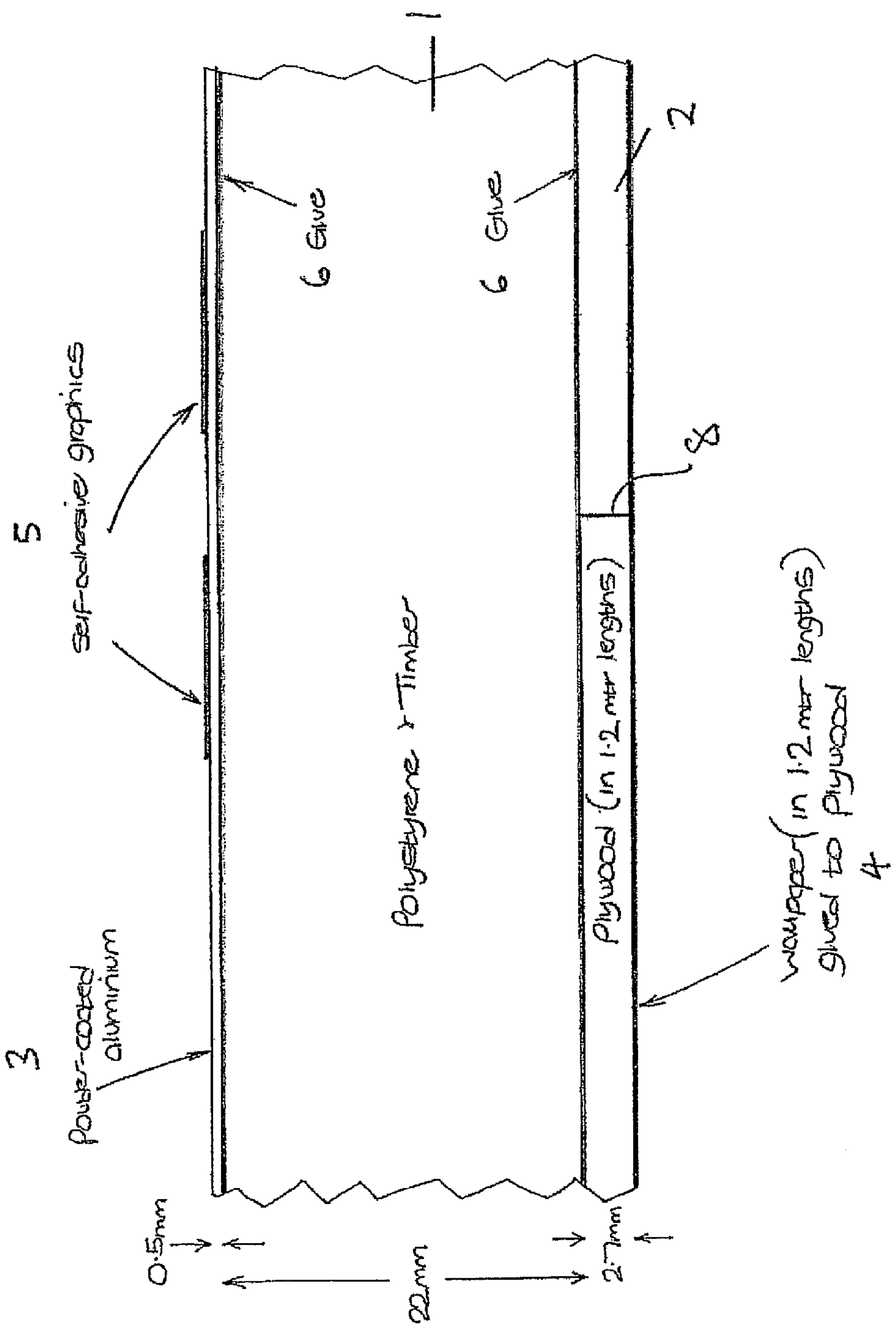
Figure 1. PRIOR ART
FIG. 1 is a schematic sectional view of a conventional wall panel for a caravan.

At step 4, a desired first design 9 is printed onto one side of the wall panel (i.e. onto the inner skin or onto the outer skin) using a direct-to-substrate printer. If the first design is printed onto the inner skin 2, it may include decoration (as would be provided by wallpaper in the conventional wall panel of FIG. 1), and may also include text such as one or more safety notices and/or operating instructions, and/or may include positions where components, such as interior fittings, are subsequently to be mounted on the wall panel. It should be noted that the first design does not need to cover the entire surface of the skin—for example, if the first design is printed onto the inner skin of the wall panel, areas of the wall panel that will be hidden from view in the finished caravan, for example because they will be behind cupboards, may be left unprinted. Where the first design include decoration intended to resemble wallpaper, since this is printed continuously on the inner skin (or at least on those areas of the inner skin where it is desired), the problem of placing adjacent strips of wallpaper such that the designs on the two strips match correctly is eliminated.

At step 5, a desired second design 10 is printed onto the other side of the wall panel (i.e. onto the outer skin 3 if the first design was printed onto the inner skin, or vice versa). If the second design is printed onto the outer skin, it may include one or more of decoration, the manufacturer's name and/or the model of the caravan, and text such as one or more safety notices and/or operating instructions. It should be noted that the second design does not need to cover the entire surface of the skin on which it is printed. For example, when the second design is printed onto the outer skin, the outer skin will usually have a desired background colour so that the second design need be printed only where additional decoration and/or information text is desired.

Figure 3:
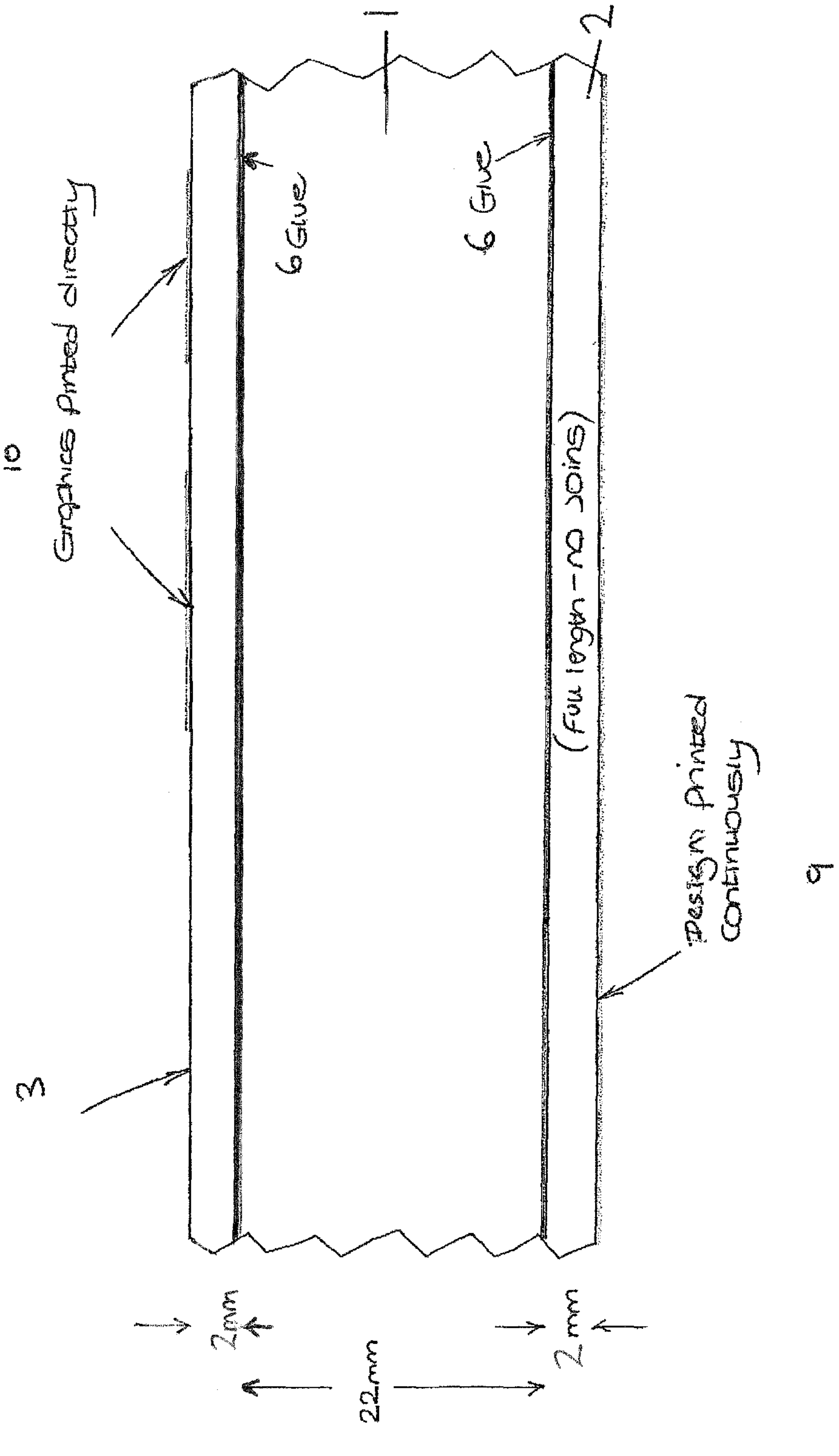
FIG. 3 is a schematic sectional view of a wall panel according to the present invention.

FIG. 3 shows a cross-section through a wall panel as manufactured by a method according to one embodiment of the present invention. In the embodiment shown in FIG. 3 the wall panel has thickness of approximately 1 inch (25.4 mm), which is a typical thick for a caravan wall panel. The matrix 1 has a width of approximately 22 mm, the APET inner skin 2 has a width of approximately 2 mm and the APET outer skin 3 has a width of approximately 2 mm. The inner and outer skins 2, 3 are glued to the matrix 1 by glue layers 6. APET skins of this thickness provide sufficient structural thickness and so the matrix may be formed of a sheet of expanded polystyrene (preferably with mounting members (for example wood) being provided in the matrix at locations where it is desired to join the wall panel to another wall panel or to the chassis, floor or roof of the caravan, or where it is desired to mount a component onto the wall panel). The invention is not however limited to these particular dimensions.

The second design is again printed using a direct-to-substrate printer. The first and second designs may be printed using the same direct-to-substrate printer, with the operator(s) removing the wall panel from the printer after the first design has been printed, turning it over, and placing it on the printer input so that the second design can be printed on the other skin. Alternatively, the first and designs may be printed using different direct-to-substrate printers.

The first and second designs may be printed using any direct-to-substrate printer that can accommodate the wall panel. Preferably the direct-to-substrate printer is an inkjet printer, and particularly preferably the direct-to-substrate printer is a printer that uses UV-based inks (or "UV inkjet printer" for short) as these have a lower environmental impact than conventional solvent-based inks. One suitable printer is a Durst Rho printer available from Durst Image Technology UK Ltd, although other UV inkjet printers may be used (for example the Truepress Jet 2500 UV printer). Alternatively a printer that uses water-based inks or other inks having a lower environmental impact than conventional solvent-based inks may be used.

The direct-to-substrate printer may be located at the site where the inner and outer skins of the wall panel are assembled onto the matrix. Once the inner and outer skins of the wall panel have been assembled onto the matrix the structurally complete (but undecorated) wall panel can be taken to the printer for the printing steps to be carried out.

All wall panels of the caravan may be manufactured according to a method of the invention, for example according to steps 1 to 5 of FIG. 4. Once all wall panels have been manufactured, they are assembled onto a suitable chassis or base. The assembly of the wall panels may be carried out according to any known technique, and does not form part of the invention and so will not be described further. The caravan may then be completed by addition of a roof and floor, fitting doors and windows, and internal fitting out. The final steps of assembling the caravan are shown schematically as step 6 in FIG. 4.

It should be noted that FIG. 4 illustrates only one embodiment of the invention, and that the invention is not limited to this embodiment. For example, although FIG. 4 shows two printing steps, one on each face of the wall panel, the invention is not limited to this. In principle, there could only be one printing step onto one face of the wall panel, with any required decoration, notices, information etc being applied to the other face in a conventional manner. For example, the outer skin of a wall panel will be subjected to the ambient weather, so that any decoration, notices, information etc printed on the outer skin may be subject to degradation owing to the effects of exposure to rain, sunlight etc. It would therefore be possible to apply the method of the invention only to the inner skin, and apply decoration, notices, information etc. to the outer skin in a conventional manner. (It should be noted that it is still preferable for the materials used for the inner skin and the outer skin to be chosen to provide a stable wall panel, for example by making both the inner skin and the outer skin of the same material, even if only one skin of the wall panel is to be printed.)

Moreover, as explained above the invention is not limited to printing the design(s) onto an assembled wall panel. It would alternatively be possible to print a design onto a skin that is intended for a wall panel but that has not yet been mounted on the matrix of the wall panel, and subsequently assemble the printed skin onto the matrix of the wall panel. Thus, in a modified embodiment of the invention, shown in FIG. 5, the step 2 of printing the first design onto the first skin for the wall panel is carried out before the step 4 of fitting the first skin onto the matrix, and the step 3 of printing the second design onto the second skin for the wall panel is carried out before the step 5 of fitting the second skin onto the matrix. (Steps 1 and 6 of FIG. 5 correspond to steps 1 and 6 of FIG. 4, and their description will not be repeated). In practice, it may be convenient to print a quantity of inner skins with the desired design for the inner skin, then print a quantity of outer skins with the desired design for the outer skin, and then assemble the skins into wall panels.

Figure 5:
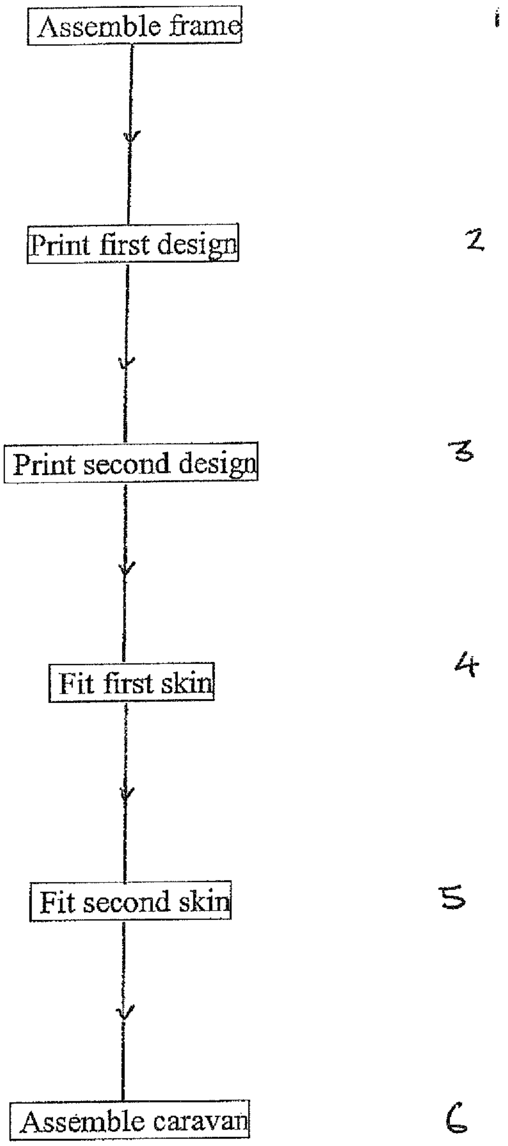
FIG. 5 is a block flow diagram illustrating principal steps of another method of the invention.

It should be understood that the embodiment shown in FIG. 4 or FIG. 5 may be described as a process which is depicted as a block flow diagram. Although the flow diagram may describe the operations as a sequential process, many of the operations can be performed in parallel or concurrently. In addition, the order of the operations may be re-arranged from the order shown. A process is terminated when its operations are completed, but could have additional steps not included in the figure.

In principle, the embodiments of FIGS. 4 and 5 could be combined, to give a method in which one skin is assembled onto the matrix before a design is printed onto it but in which the other skin is assembled onto the matrix after a design is printed onto it.

In the embodiments described above, the printer used is a direct-to-substrate printer. In principle however the invention is not limited to this and an indirect printer could be used (where an "indirect" printer is a printer that prints an intermediate image onto an intermediary surface, such as roller, with the image then being transferred from the intermediary surface to the substrate that is to be printed. However, use of an indirect printer is likely to have greater set-up costs than use of a direct-to-substrate printer and so use of a direct-to-substrate printer is preferred.

If desired, a protective coating such as a varnish coating may be applied over a design printed onto a wall panel or a skin for a wall panel, to protect the printed design against damage, spillage and weather (in the case of the external face of the wall panel). Some direct-to-substrate printers have one or more spare print heads (where a "spare" print head is one that is not required to print white or a colour) and, if the printer used has a spare print head, the spare print head may be used to apply a protective coating such as varnish over the printed design; this allows the design to be printed and covered with the protective coating in a single pass through the printer. Alternatively a protective coating may be applied in a separate operation using a separate device.

In the embodiments described above the two faces of a wall panel, have been printed in separate operations. In principle the two faces of a wall panel could printed in a single operation using a printer that is able to print both faces in a single pass.

The invention claimed is:

1. A method of manufacturing a wall panel for a caravan, the method comprising:

providing a matrix of the wall panel;

printing a first design onto an outer side of a first skin of the wall panel before the wall panel is assembled;

attaching the first skin to a first side of the matrix; and attaching a second skin to a second side of the matrix that is opposite the first side, wherein the first skin and the second skin are structural components of the wall panel.

2. The method as claimed in claim 1 wherein the first skin forms, in use, an interior skin of the wall panel.

3. The method as claimed in claim 1 and further comprising printing a second design onto the second skin of the wall panel.

4. The method as claimed in claim 3 and comprising printing the first design using a first direct-to-substrate printer.

5. The method as claimed in claim 4 and comprising printing the second design using a second direct-to-substrate printer.

6. The method as claimed in claim 5 wherein the first direct-to-substrate printer and the second direct-to-substrate printer are the same printer.

7. The method as claimed in claim 5 wherein each printer of the first direct-to-substrate printer and the second direct-to-substrate printer is an inkjet printer.

8. The method as claimed in claim 7 wherein each printer of the first direct-to-substrate printer and the second direct-to-substrate printer is a UV inkjet printer.

9. The method as claimed in claim 3, wherein the second skin is formed of the same material as the first skin.

10. The method as claimed in claim 1 wherein the first skin is a non-metallic skin.

11. The method as claimed in claim 10 wherein the first skin is formed of one of: HIPS (high impact polystyrene), APET (amorphous polyethylene terephthalate), ABS (Acrylonitrile butadiene styrene), a composite material, foam PVC or water-resistant MDF (medium density fibreboard).

12. The method as claimed in claim 10 wherein the second skin is a sheet of aluminium.

* * * * *